United States Patent
Fetzer et al.

(10) Patent No.: US 10,106,050 B2
(45) Date of Patent: Oct. 23, 2018

(54) POWER SUPPLY DEVICE FOR AN ELECTRICALLY OPERABLE VEHICLE AND CHARGING METHOD

(71) Applicant: Robert Bosch GmbH, Stuttgart (DE)

(72) Inventors: Joachim Fetzer, Bad-Ditzenbach (DE); Stefan Butzmann, Schalksmühle (DE); Holger Fink, Stuttgart (DE); Hans Partes, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 262 days.

(21) Appl. No.: 15/117,694

(22) PCT Filed: Jan. 30, 2015

(86) PCT No.: PCT/EP2015/051894
§ 371 (c)(1),
(2) Date: Aug. 9, 2016

(87) PCT Pub. No.: WO2015/121083
PCT Pub. Date: Aug. 20, 2015

(65) Prior Publication Data
US 2016/0355099 A1     Dec. 8, 2016

(30) Foreign Application Priority Data
Feb. 11, 2014 (DE) .................. 10 2014 202 410

(51) Int. Cl.
*B60L 11/18* (2006.01)
*B60W 10/08* (2006.01)
(Continued)

(52) U.S. Cl.
CPC .......... *B60L 11/1864* (2013.01); *B60L 1/003* (2013.01); *B60L 11/126* (2013.01);
(Continued)

(58) Field of Classification Search
None
See application file for complete search history.

(56) References Cited

U.S. PATENT DOCUMENTS

| 6,330,925 B1* | 12/2001 | Ovshinsky | ............... B60K 6/24 |
| | | | 180/65.245 |
| 2013/0300126 A1* | 11/2013 | Butzmann | ............... F02B 63/04 |
| | | | 290/1 A |
| 2014/0180519 A1* | 6/2014 | Niimi | ..................... B60K 6/445 |
| | | | 701/22 |

FOREIGN PATENT DOCUMENTS

| DE | 10 2010 064 325 A1 | 7/2012 |
| DE | 11 2011 100 239 T5 | 10/2012 |

(Continued)

OTHER PUBLICATIONS

International Search Report corresponding to PCT Application No. PCT/EP2015/051894, dated Feb. 16, 2016 (German and English language document) (8 pages).

*Primary Examiner* — Jared Fureman
*Assistant Examiner* — Aqeel Bukhari
(74) *Attorney, Agent, or Firm* — Maginot, Moore & Beck LLP

(57) ABSTRACT

The disclosure relates to a power supply device for an electrically operable vehicle having an electric drive motor. The power supply device comprises an electric energy accumulator device, a range-extender with an internal combustion engine and a generator producing alternating current. The generator is mechanically connectable to the internal combustion engine, and the energy accumulator device is configured to be charged during driving with the alternating current from the generator. The energy accumulator device comprises several power supply connections on which respectively one of several controllable potentials can be provided, and several power supply branches having (Continued)

several serially connected power cell modules. Several power supply branches are interconnected on one end to the neutral point and each power supply connection is connectable to one end of a power supply branch.

13 Claims, 6 Drawing Sheets

(51) Int. Cl.
*B60W 10/26* (2006.01)
*H02J 7/14* (2006.01)
*B60L 1/00* (2006.01)
*B60L 11/12* (2006.01)
*B60L 15/00* (2006.01)
*B60L 15/20* (2006.01)
*B60W 20/13* (2016.01)

(52) U.S. Cl.
CPC ....... *B60L 11/1816* (2013.01); *B60L 11/1853* (2013.01); *B60L 11/1861* (2013.01); *B60L 15/007* (2013.01); *B60L 15/2054* (2013.01); *B60W 10/08* (2013.01); *B60W 10/26* (2013.01); *B60W 20/13* (2016.01); *H02J 7/1415* (2013.01); *H02J 7/1423* (2013.01); *H02J 7/1438* (2013.01); *B60L 2210/40* (2013.01); *B60L 2240/421* (2013.01); *B60L 2240/427* (2013.01); *B60L 2240/429* (2013.01); *B60L 2240/441* (2013.01); *B60L 2240/547* (2013.01); *B60L 2240/549* (2013.01); *B60L 2240/80* (2013.01); *B60L 2270/145* (2013.01); *Y02T 10/6217* (2013.01); *Y02T 10/645* (2013.01); *Y02T 10/7005* (2013.01); *Y02T 10/7044* (2013.01); *Y02T 10/7061* (2013.01); *Y02T 10/7072* (2013.01); *Y02T 10/7077* (2013.01); *Y02T 10/7241* (2013.01); *Y02T 10/7275* (2013.01); *Y02T 90/127* (2013.01); *Y02T 90/14* (2013.01); *Y10S 903/907* (2013.01)

(56) References Cited

FOREIGN PATENT DOCUMENTS

| | | |
|---|---|---|
| DE | 10 2012 202 868 A1 | 8/2013 |
| DE | 11 2012 001 156 T5 | 1/2014 |
| EP | 2 658 738 A2 | 7/2012 |
| WO | 2012/038162 A1 | 3/2012 |
| WO | 2012/089397 A2 | 7/2012 |
| WO | 2012/159811 A2 | 11/2012 |
| WO | 2014/016126 A1 | 1/2014 |

* cited by examiner

POWER SUPPLY DEVICE FOR AN ELECTRICALLY OPERABLE VEHICLE AND CHARGING METHOD

This application is a 35 U.S.C. § 371 National Stage Application of PCT/EP2014/051894, filed on Jan. 30, 2015, which claims the benefit of priority to Serial No. DE 10 2014 202 410.2, filed on Feb. 11, 2014 in Germany, the disclosure of which are incorporated herein by reference in their entirety.

BACKGROUND

This disclosure relates to an energy supply device for providing energy for an electrically operable vehicle. The disclosure further relates to a method for charging an energy supply device of this kind.

Many electrically operable vehicles require an electrical AC voltage, which is often a single- or three-phase voltage, in order to be supplied with power. The prior art discloses electrical energy storage devices which comprise a large number of energy cell modules which each comprise an electrochemical cell. Several of the energy cell modules are interconnected in series and form an energy supply branch. The electrochemical cells of the individual energy cell modules can be coupled into their energy supply branch by means of a coupling device, for example a 4-quadrant actuator. The voltage which is generated by an electrochemical cell can be coupled into the energy supply branch with a different polarity, so that both positive and also negative voltages can be generated by way of one energy supply branch. As an alternative, the electrochemical cell can be decoupled and bridged by generating a short circuit between the integration connections of the energy cell module in the series circuit, this being called the bypass mode. For the purpose of charging an energy cell module, the electrochemical cell of said energy cell module is coupled into the energy supply branch in such a way that the voltage of said energy cell module is directed against a charging voltage. For discharging purposes, or for supplying power to a load, the electrochemical cell is coupled into the energy supply branch with a polarity with which current flows through the load in the correct direction. Owing to the energy cell modules being coupled-in in a coordinated manner, an AC voltage with a frequency which can be freely selected within operating limits can be generated. An energy storage device of this kind is called a Battery Direct Inverter (BDI). A BDI behaves, at its energy supply connections, like a conventional converter with an intermediate circuit. Therefore, all loads which can be connected to a conventional converter can also be connected to a BDI. An example of a BDI of this kind from the prior art is disclosed in WO 2012/159811.

So-called range extenders are known for use in electrically driven vehicles. Said range extenders comprise a generator which can be driven by way of an internal combustion engine. The internal combustion engine is started when the energy content of the energy storage device falls below a critical threshold, and then drives the generator. The battery is charged by way of the generator via rectifiers. A drive motor is supplied with electrical energy from the battery via an inverter. In one variant, the drive motor can also be supplied with power from the generator. The battery is usually arranged in a DC voltage intermediate circuit.

SUMMARY

In order to improve the known energy supply devices, it is proposed, according to the disclosures, to charge a BDI by way of a generator, which generates alternating current, of a range extender during energy output from the energy supply system. By way of example, the range of an electrically operated vehicle is advantageously increased by the option of recharging the energy storage device during driving. The alternating current for charging the BDI is particularly preferably not intermediately converted into a direct current, but rather is used directly for charging the BDI. In the BDI, a plurality of energy supply branches are interconnected at one end to form a star point. The star point is arranged at the end of the energy supply branch at which there is no energy supply connection of the energy supply branch. Here, the term "star point" refers to the point or the potential of the interconnection of the energy supply branches. Given asymmetrical alternating current in the energy supply branches, there may be a zero potential at the star point. The generator and/or the drive motor are preferably three-phase electrical machines, and the energy storage device has at least three energy supply branches. In one version, the range extender generates more mechanical power than is required for driving the vehicle when charging the energy storage device while in the driving mode at the same time. The excess power is used to charge the energy storage device. The mechanical power of the internal combustion engine of the range extender is preferably greater than the electrical drive power of the drive machine and, in particular, greater than the drive power of the electrical drive machine divided by the degree of efficiency of the generator. The range extender preferably runs at constant power and/or constant rotation speed. As a result, operation of the range extender can be optimized. The drive machine can be designed as a transversal flux machine. In addition to charging by means of the generator, charging from a public electrical supply system is also preferably possible, it being possible for the energy supply device to comprise connections and means for this purpose.

The dependent claims describe preferred developments of the disclosure.

In one embodiment, some of all of the energy cell modules of the energy storage device can be charged by means of the generator. The energy storage device and/or the energy supply device accordingly have means for partially charging the energy storage device. This partial charging has the advantage that some of the energy cell modules can be charged, while others supply energy for the vehicle. In this way, charging during electric driving is possible. In this case, energy for the driving operation can be drawn from that portion of the energy storage device which is not to be charged. As an alternative or in addition, electrical energy can be diverted from the generator for the driving operation.

In a further embodiment, the energy storage device comprises more energy supply branches than energy supply connections. In conjunction with one or more switching devices, this enables as many energy supply branches for supplying power to an electrical load by way of the energy supply connections to be connected as there are energy supply connections. In this way, energy supply branches which are currently not connected to an energy supply connection and do not serve to supply power can be charged by way of the generator, for which purpose said energy supply branches can be connected to said generator. Therefore, it is possible to charge some of all of the energy supply branches, while others are available for discharging, for example in a driving mode. After an energy supply branch is charged, it can be disconnected from the generator and switch to a discharge mode by being connected to an energy supply connection.

In one example of this embodiment, the energy supply device comprises twice as many energy supply branches as energy supply connections. A plurality of energy supply branches, of which the number corresponds to the number of energy supply connections, are preferably interconnected at one end to form a star point. A star point is preferably formed by two, or particularly preferably by three, energy supply branches.

In a further example of this embodiment, each energy supply branch can be connected to an energy supply connection by means of a switching device and can be connected to the generator by way of a further switching device. Suitable actuation of the switching devices and of the coupling devices of the energy cell modules can result in the energy supply branches outputting or receiving energy. Energy supply branches which have a common star point are particularly preferably jointly connected to the energy supply connections or connected to the generator. The switching devices are preferably semiconductor valves. The energy supply branches which are connected to one another by means of a star point preferably act like individual BDIs. Methods for discharging a BDI are known from the prior art. Charging of a BDI can be carried out in an analogous manner. A BDI can be charged with alternating current without an intermediate DC voltage circuit. In one variant, the switching devices can be switched such that current can flow from the generator both to an energy supply branch and also to an energy supply connection. In this case, energy from the generator can be used both for charging purposes and also for output to a load. Energy output from the energy supply device can be controlled by adjusting the current consumption of the energy storage device, for example by pulse-width-modulated coupling of energy cell modules into their energy supply branch. Since the current from the generator is alternating current, the switching devices are preferably bidirectional semiconductor switches. This applies for all variants and embodiments of this disclosure.

In a development of this embodiment, an energy supply device is proposed in which one end of each of the energy supply branches can be connected or is connected to the generator, and the other end of each of the energy supply branches can be connected or is connected to the generator or/and to an energy supply connection by means of a switching device which can be electrically actuated. Those ends of the energy supply branches which are connected to the generator form a star point. The energy supply device has an energy supply branch which can be connected to each of the energy supply connections by means of one switching device in each case. The same number of energy supply branches as there are energy supply connections can be connected to a specific one of the energy supply connections by means of a switching device in each case. The above-mentioned switching devices can preferably be actuated such that each of the energy supply connections is connected to one of the energy supply branch, while a further energy supply branch is connected to the generator. If an energy supply branch, which can be connected to each of the energy supply connections, is to be discharged, said energy supply branch is connected to an energy supply connection which is permanently associated with another energy supply branch, but is not connected to its energy supply connection, for example because it is in charging mode and is connected only to the generator. The alternating current from the generator is preferably rectified by way of a rectifier. The rectifier and also the switching devices can be part of the energy storage device.

In a further embodiment, at least two, preferably three or all of the energy supply branches between two energy cell modules each have a generator connection in the interior of the energy supply lines, in each case one phase of the generator being connected to said generator connection. The manner of operation and the operating options of this embodiment are described below with reference to a method.

In a further embodiment, the energy supply device has special features of the range extender or of the generator and drive motor. Importance is attached to this embodiment of the energy supply device independently of the other embodiments. The vehicle can be driven by means of the drive motor with energy from the range extender. As an alternative or in addition, the vehicle can be driven with mechanical energy from the range extender. In a preferred version, both the electric drive motor and also the part of the range extender which acts as a generator are rotationally connected to a wheel of the vehicle. The generator can be mechanically coupled to the drive motor in a phase-locked manner. Therefore, the generator can generate alternating current with the same frequency and phase position as that received by the drive motor for the purpose of operating the said drive motor. A transmission is arranged between the internal combustion engine and the generator in the mechanical section of the range extender. This transmission allows the rotation speed of the generator to be matched to the rotation speed of the internal combustion engine at different driving speeds. The transmission is preferably a continuously variable transmission (CVT transmission) which can preferably be adjusted by means of an actuating motor. A magnetic excitation means for the generator is preferably provided in this embodiment, it being possible for the power of the generator to be controlled by way of said magnetic excitation means, it also being possible to control the charging process of the energy storage device in this way. In this embodiment, the generator can be selectively connected to the energy storage device or disconnected from said energy storage device by means of a switching device. A charging process can be switched on and switched off in this way.

In a development of this embodiment, the rotational coupling between the generator and the internal combustion engine can be disconnected by a clutch. In this way, it is possible to prevent the internal combustion engine from falling below its lower rotation speed limit at low driving speeds. As an alternative or in addition, a clutch can be arranged between the generator and the drive motor. This has the effect that the generator can also be operated when the vehicle is stationary. The clutches can be designed, for example, as a centrifugal clutch or as an electromechanically operable clutch.

The clutch between the drive machine and the generator is preferably designed such that the drive machine and the generator can be coupled to one another only in a rotation position in which they assume a predefined phase position in relation to one another. For example, the clutch can act in an interlocking manner, for example in the manner of a claw connection as is customary, for example, in the case of a synchronized transmission between a shaft and a gear wheel. The generator and the drive machine preferably have the same number of poles. The angular position of the poles preferably corresponds when the interlocking clutch latches.

In a further variant of this embodiment, the generator and the drive motor are combined to form one unit. In particular, the generator and the drive motor can be the same electrical machine.

In this embodiment, the drive motor is also connected to the energy storage device, wherein this connection can preferably be interrupted by a switching device. This switching device can be a switching device which is different to the switching device for the charging process. However, in a variant with an electrical machine which serves as a generator and as a drive motor at the same time, a single switching device for connecting and, respectively, disconnecting the energy storage device from the electrical machine can also be provided for both functional components.

In one version of this embodiment, at least a major portion of the mechanical energy of the internal combustion engine is converted into electrical energy by the generator and distributed between drive energy and charging energy in an electrical manner. To this end, the drive motor is electrically connected to the generator and receives energy which is generated by said generator as electrical alternating current.

In this variant, there is also a rotational coupling between the generator and the drive machine, and therefore said generator and drive machine run in the same phase. Therefore, the frequency and phase of the current which is generated by the generator coincide with the phase and frequency of the current which is received by the drive machine. In this variant, the mechanical connection between the drive machine and the generator serves primarily to ensure the permanent phase coupling between the generator and the drive machine. Said mechanical connection can be designed with a lower mechanical strength than would be necessary for mechanically transmitting all of the power of the internal combustion engine.

In a further variant, the generator and the drive motor are each equipped with an associated switching device. The mechanical connection between the generator and the drive machine is preferably designed such that all of the mechanical power of the internal combustion engine can be transmitted thereby. When the switching device of the generator is closed, the energy storage device is charged with alternating current from the generator. In this case, the switching device of the drive machine can be opened, so that no current flows from the generator to the drive machine. Driving is effected by transmitting mechanical energy of the internal combustion engine to the drive machine by means of the generator and the connection, and from said drive machine to at least one wheel of the vehicle. In this operating state, the drive machine runs along under no load. During electric driving, the switching device of the generator can be opened and the switching device of the drive machine can be closed, so that the drive machine is connected to the energy storage device and can be operated from said energy storage device. When both switching devices are closed, some of the energy which is generated by the generator can be used for charging purposes and some can be used as drive energy.

A further aspect of the disclosure proposes a method for charging an energy supply device in line with one of the above-described embodiments, according to which method the energy supply device is charged while the vehicle is supplied with drive energy from the range extender. The generator of the range extender supplies an AC voltage, preferably a three-phase AC voltage, which is preferably not rectified, for charging purposes.

In one embodiment of the method, some of the energy cell modules of the energy storage device are charged with alternating current from the generator by way of the generator. As a result, electric driving can be maintained by way of the rest of the energy cell modules. In a variant, it is also possible for the rest of the energy cell modules to operate such that they act as a converter between a generator frequency and a frequency which is to be output by the energy supply device, for example to a drive machine.

In a further embodiment of the method, an initial power of the generator is divided into a charging power for charging electrochemical cells of the energy storage device and into an energy supply power with which a load which is connected to the energy supply device is supplied with power. In order to achieve the division, energy cell modules are coupled into their energy supply lines, so that said energy supply lines receive charging current from the generator. The energy cell modules which are to be charged and the load are preferably connected in parallel in this case. As a result, the current from the generator can be divided into a charging current and a supply current. As an alternative or in addition, the load can be connected in series with energy cell modules which are to be charged, so that the charging voltage which is output by the generator is distributed between the load and the energy cell modules which are to be charged. Division of the power can be controlled by the number of coupled-in electrochemical cells and the duration of this coupling-in operation. The coupling-in operation can be performed such that a desired voltage or a desired current is established. To this end, it is possible to change between coupling energy cell modules into their energy supply branch and the bypass mode of said energy cell modules, for example in line with a known pulse-width-modulation method. In the event of power distribution, only some of all of the energy cell modules are preferably charged, wherein, for example, only some of all of the energy supply branches or only some of all of the energy cell modules in an energy supply branch can be charged.

In a further embodiment of the method, a number of energy supply branches are connected to the energy supply connections during an energy supply mode, in order to supply power to a load, while at the same time at least one further energy supply branch is connected to the generator in order to charge said generator. In this way, it is possible to charge some of the energy storage device during the energy supply mode, for example when an electrically driven vehicle is in a driving mode.

In one version, a set of energy supply lines, the number of which is identical to the number of energy supply connections of the energy supply device, is preferably charged by means of the range extender. A second set with the same number of energy supply lines outputs energy for the driving operation at the same time. The energy supply lines in one set are interconnected at a star point. After one set is discharged, said set can be recharged and a further set, which was charged during the discharging operation, can be discharged in the driving mode. To this end, switching devices of the energy supply unit are suitably switched. Electrical energy for the driving operation is always available in this way. The sets act like individual BDIs and can be discharged and charged as such.

In a further embodiment of the method, switching devices of the energy supply device can be controlled, for the purpose of outputting energy from the energy supply device, in such a way that an energy supply branch is connected to each energy supply connection, while at the same time an energy supply branch is connected to the generator for charging purposes. In this case, the energy supply branches which output energy can be energy supply branches which can be connected exclusively to a specific one of the energy supply connections. However, if one of these energy supply branches is not connected to an energy supply connection, while it is being charged for example, an energy supply branch which can also be connected to other energy supply connections can be connected to the energy supply connection of said one energy supply branch in order to replace it during the energy output operation. In this variant, all of the energy supply branches are combined to form a single star point to which the generator is connected. As a result, one switching element for each energy supply branch is sufficient for connection to the generator. The generator is preferably a single- or three-phase AC generator. The two potentials of a single-phase generator can be connected to the energy storage device or the switching elements of said energy storage device without rectification. In the case of a three-phase generator, a rectifier is preferably connected between the energy storage device or the switching elements of said energy storage device and the generator. The energy supply branch which is to be charged is particularly preferably replaced by the energy supply branches, so that uniform charging and discharging of the energy supply branches takes place overall. A total of four energy supply branches are particularly preferably provided. In this case, the energy supply branch which is to be charged is preferably charged with more current, preferably at least three times as much current, than is drawn from it in the discharge mode. In this way, it is possible to ensure that the energy storage device does not become empty even though discharge times are longer than charging times owing to the energy supply branches being replaced between charging mode and discharge mode.

In a further embodiment, some of all of the energy cell modules within an energy supply branch are charged. To this end, a connection to the generator is provided in the interior of the energy supply branch. A plurality of energy supply branches of this kind are interconnected at one of their ends to form a star point. The respectively other end of the energy supply branches is connected to an energy supply connection. A generator voltage can be applied between two generator connections of the energy supply branches, said generator voltage acting on the energy cell modules between the generator connection of one energy supply branch and the star point and also between the star point and the generator connection of the other energy supply branch. Therefore, said energy supply branches can be charged with alternating current from the generator using suitable actuation, which is known in accordance with the prior art, of the individual energy cell modules. A three-phase generator and three energy supply branches are preferably provided. The phases of the generator are connected to the respective generator connections of the energy supply branches, so that all of the energy cell modules between the generator connections and the star point can be charged. The generator connections are arranged between two energy cell modules.

In a variant, the energy cell modules which are to be charged can be decoupled from the other energy cell modules, so that said other energy cell modules can act as BDIs for outputting energy, while the energy cell modules which are to be charged are charged like a BDI.

In a development of this embodiment, the energy cell modules between the generator connections and the star point can be controlled such that they do not receive all of the current from the generator. In this way, it is possible to divide the generator current and to use some for charging purposes and some to be output to a load by means of the energy supply connections. To this end, the energy cell modules between the generator connections and the energy supply connections are preferably short-circuited, so that the electrochemical cells are not coupled into the energy supply branches and current can flow from the generator directly to the energy supply connections.

In a further development, the portion of energy cell modules which are arranged between the generator connections and the star point act as a converter which converts a frequency of the generator into a frequency which is to be output to a load. To this end, the energy cell modules can be coupled into their energy supply branches in such a way that they supply a voltage difference which is given by the profile of the generator voltage and the profile of the voltage which is to be output by the energy supply device. If the generator voltage and the voltage which is to be output when considered together are a three-phase AC voltage over three energy supply branches, said voltages can be shown in a three-dimensional manner in a space vector illustration. In this case, the generator voltage can be represented as a vector which rotates in three dimensions and the voltage which is to be output can be represented as a further voltage vector. Owing to the different frequencies, the two voltage vectors rotate at different speeds in the space vector representation. A voltage which is to be instantaneously set by way of the energy supply branches at the different phases can be determined from the instantaneous difference vector between generator voltage and voltage which is to be output. The voltage which is to be output is applied in each energy supply branch between the star point and the energy supply connection. The generator voltage is applied in each energy supply module between the generator connection and the star point. In order to allow the energy cell modules between the generator connection and the star point to be charged by way of the generator, it is necessary to match said modules to the frequency of the generator and accordingly to couple said modules into the energy supply branches. The voltage which is to be output and generated at a different frequency is therefore generated from the energy cell modules between the generator connection and the energy supply connection in each of the energy supply branches by the difference voltage between the generator voltage and the voltage which is to be output being generated in each energy supply branch. To this end, there can be a sufficient number of energy cell modules in the sections of the energy supply branches between the respective generator connections and energy supply connections in order to be able to generate the maximum voltage difference between the voltage which is to be output and the generator voltage. The number of energy cell modules in the section of the energy supply branches between the generator connection and the star point is preferably so great that the sum of the cell voltages can be at least as high as a maximum generator voltage. When the energy supply device has a range extender with an internal combustion engine and an electrical drive machine of a vehicle is intended to be supplied with power from the energy supply device, the rotation speed of the internal combustion engine can be decoupled from the rotation speed of the drive machine owing to the converter effect of the energy storage device.

In a development of the energy supply device according to this embodiment, the modulation of the current to the load is effected by energy cell modules being connected against the direction of the current to the load in such a way that they are charged by the current and at the same time reduce the voltage across the load in the portion of the energy storage device which is arranged between the generator connections and the energy supply connections. By virtue of suitable coupling of the energy cell modules into the sections of the energy supply branches between the generator connections and the energy supply connections, the frequency of the generator can be converted into the frequency of the voltage which is to be output by energy cell modules being connected into the energy supply branches for charging purposes when a lower voltage is intended to be output from the energy supply branch than is supplied by the generator, and by energy cell modules outputting energy and supplying voltage for the load when the generator voltage is lower than the voltage, which is to be output, in an energy supply branch. In a combined version, the energy cell modules are temporarily charged and temporarily output energy, depending on what is required for providing the voltage which is to be output.

In a further embodiment of the method, the electrochemical cells which are coupled into an energy supply branch for charging purposes and/or energy supply branches which are connected to the generator for charging purposes are exchanged in such a way that all of the energy cell modules are supplied with charging current on average over time, and in particular all of the energy cell modules are uniformly charged. To this end, a defined exchange scheme can be used or, in an another variant, it is possible to store information as to which electrochemical cell was charged and, in particular, additionally how long it was charged for. In this way, information about charging of all of the energy cell modules is available for managing and controlling charging of the energy cell modules. In particular, defective energy cell modules can be removed from operation in this case. Methods which are already known can be used for managing charging of the energy cells.

BRIEF DESCRIPTION OF THE DRAWINGS

Exemplary embodiments of the disclosure will be described in detail below with reference to the accompanying drawings, in which.

DETAILED DESCRIPTION

Figure 1:
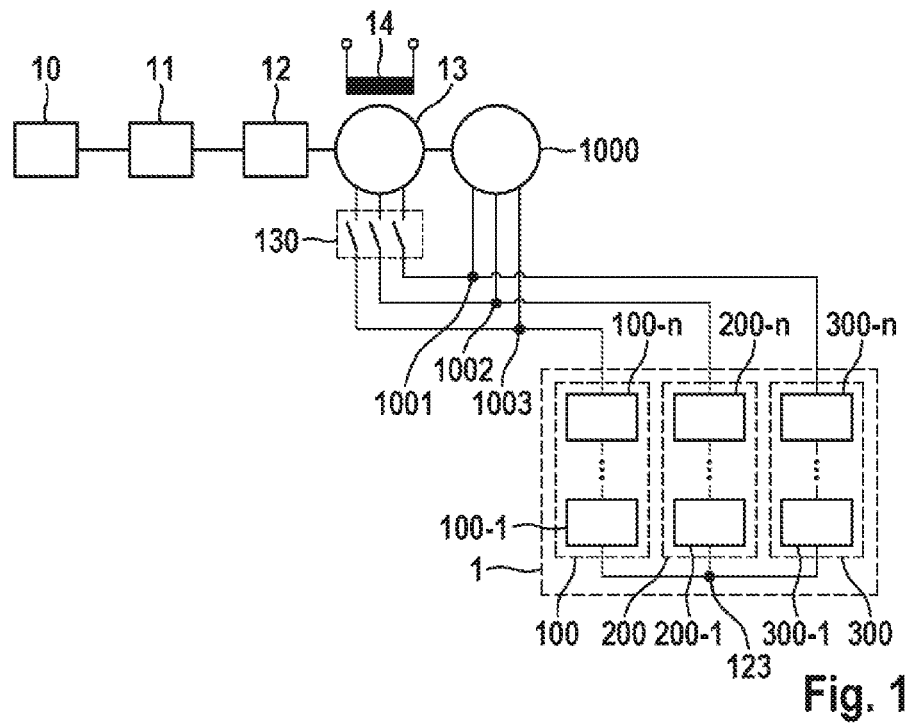
FIG. 1 shows a schematic circuit diagram of a first embodiment of the energy supply device according to the disclosure.

FIG. 1 schematically shows a circuit diagram of one embodiment of the energy supply device. The energy supply device comprises a range extender which, for its part, comprises an internal combustion engine 10, a mechanical clutch 11, a transmission 12, a generator 13 with a controllable field winding 14. The internal combustion engine 10, the clutch 11, the transmission 12 and the generator 13 are rotationally coupled to one another. A drive machine 1000 of a vehicle is coupled in a rotationally fixed manner to the generator. The drive machine 1000 is not part of the energy supply device. An energy storage device 1 is connected to the generator 13 by means of a switching device 130. The drive machine 1000 is connected to the energy supply device 1 without an interposed switching device. The generator 13 and the drive machine 1000 are designed as three-phase machines and have the same number of pole pairs. The energy storage device 1 comprises three energy supply branches 100, 200, 300 which each have n energy cell modules 100-1 to 100-nand, respectively, 200-1 to 200-nand, respectively, 300-1 to 300-n. One end of each energy supply branch 100, 200, 300 is interconnected to the ends of the other energy supply branches 100, 200, 300 at a star point 123. The respective other ends of the energy supply branches 100, 200, 300 can each be connected to a phase of the generator 13 and are connected to in each case one phase of the drive machine 1000.

The clutch 11 can be designed as a centrifugal clutch or can be electromechanically operated. The rotationally fixed connection between the generator 13 and the drive machine 1000 leads to an identical frequency and phase position of the electrical voltages of the generator and of the drive machine. The transmission 12 is preferably designed as a continuously variable transmission (CVT transmission). The transmission ratio between drive and output can preferably be varied continuously within certain limits by means of an actuating motor. Therefore, continuously variable rotation speed adjustment between the internal combustion engine and the generator is possible within certain limits. The amplitude of the output voltage of the generator 13 can be varied by means of the field control system 14. The energy storage device 1 is connected without an intermediate DC voltage circuit or converter and by means of the switching device 130. The switching device 130 is preferably designed as a three-pole safety protection means.

The energy cell modules have a coupling unit by way of which the energy cell modules can be operated in different modes of operation, specifically at least normal discharging, discharging with reversed current, and charging, and also bypass operation in which the electrochemical cell is not coupled into the energy supply branch and the energy cell module in the energy supply branch is short-circuited. The coupling unit can be designed, for example, as an H-bridge or four-quadrant actuator or as a two-quadrant actuator with a reversible output current. An electrochemical cell, which forms part of an energy cell module 100-1 to 300-n, can be connected into an energy supply branch 100, 200, 300 in different polarity directions by way of the coupling unit, as is already known from the prior art.

A stepped sinusoidal three-phase voltage can be generated with the energy storage device 1 by means of the coupling units of the energy cell modules 100-1 to 300-n. If a critically low state of charge is reached in the energy storage device 1, the internal combustion engine 10 starts. Said internal combustion engine is started under no load and initially not coupled into the mechanical line comprising clutch 11, transmission 12, generator 13 and drive machine 1000. The required rotation speed for the internal combustion engine is determined and set on the basis of the instantaneous driving speed and number of revolutions of the machine and, respectively, of the generator and of the internal combustion engine. In addition, the transmission ratio is set such that at least approximately the same rotation speeds are applied to both sides of the clutch, so that said clutch can engage at least approximately smoothly. A further objective of the clutch 11 is to be able to disconnect the internal combustion engine 10 from the transmission 12 in the case by the vehicle driving at a speed which is less than a critical speed. This critical speed corresponds to the minimum rotation speed of the internal combustion engine 10 given the smallest possible step-up ratio or highest possible step-down ratio of the transmission 12. When the critical speed is reached, the clutch is opened and the mechanical drive train between the internal combustion engine 10 and the transmission 12 is opened. The opening rotation speed of a centrifugal clutch 11 preferably lies close to a minimum rotation speed of the internal combustion engine.

The energy storage device 1 is charged by the generator 13 in parallel with the driving operation by way of the drive machine 1000. In this case, the switching device 130 is closed. In order to distribute the current from the generator 13 to the drive machine 1000 and the energy storage device 1, the energy storage device 1 is controlled by controlling the coupling units such that they receive power of the generator which is not required for the driving operation. During control of the energy storage device 1, a suitable number of energy cell modules in the respective branch are moved to charging or bypass mode in order to set a back-e.m.f. of the energy cell modules 100-1 to 300-n which is suitable for the instantaneous generator voltage. By way of example, only one energy cell module is in the charging mode at the zero crossing of the sinusoidal generator voltage. If the voltage across a module rises above a critical value, a further energy cell module 100-1 to 300-n is connected into the energy supply branch 100, 200, 300 for charging purposes, and either all of the modules or all of the modules apart from one are in the charging mode at a peak value of the generator voltage. All of the energy cell modules 100-1 to 300-n of an energy supply branch 100, 200, 300 are charged on average over time, so that energy cell modules 100-1 to 300-n, which were in the bypass mode for a period of time, are alternately moved to the charging mode, and vice versa. The internal combustion engine 10 is switched off when a defined average or upper charging threshold of the energy cell modules is reached.

Figure 2:
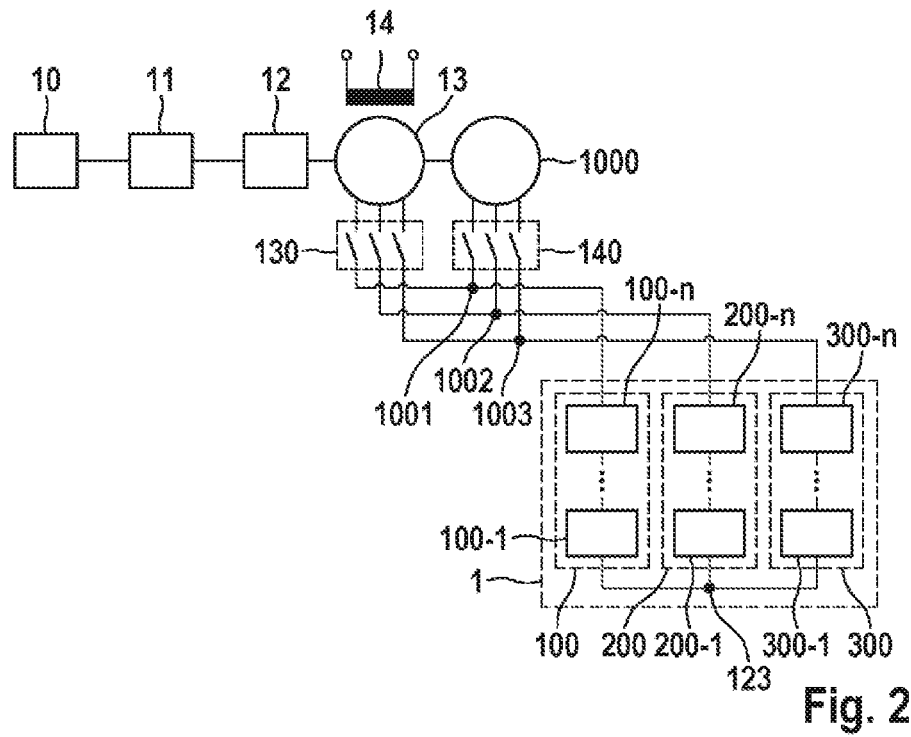
FIG. 2 shows a schematic circuit diagram of a second embodiment of the energy supply device.

FIG. 2 schematically shows a block diagram of a second embodiment of the energy supply device. Many details of said second embodiment are identical or similar to the first embodiment. Identical features or components are provided with the same reference symbols. The differences between the first embodiment and the second embodiment will be discussed in the text which follows.

The second embodiment differs from the first embodiment in that the connection of the drive machine 1000 to the energy storage device 1 can be interrupted by a switching device 140. In addition, the rotational coupling between the generator 13 and the drive machine 1000 is designed such that it can transmit the mechanical power of the internal combustion engine 10 to the drive machine and therefore ultimately to wheels of a vehicle which is to be driven. In contrast to the first embodiment, the driving power can be directly mechanically provided by the internal combustion engine in the second embodiment. In this mode, it is possible to charge the energy storage device 1 at the same time.

To this end, the switching device 140 is opened and the drive machine 1000 is electrically disconnected from the energy storage device 1. The switching device 130 is closed. The energy storage device 1 is charged by means of the generator 13 which runs with it, this being possible, while driving at the same time, by means of a direct mechanical connection. The generator voltage can be set by means of the field winding 14 such that the energy storage device 1 receives a suitable charging voltage in each case. In particular, said energy storage device can even be charged at a low rotation speed of the internal combustion engine 10. In this operating state, the drive machine 1000 runs along under no load.

Figure 3:
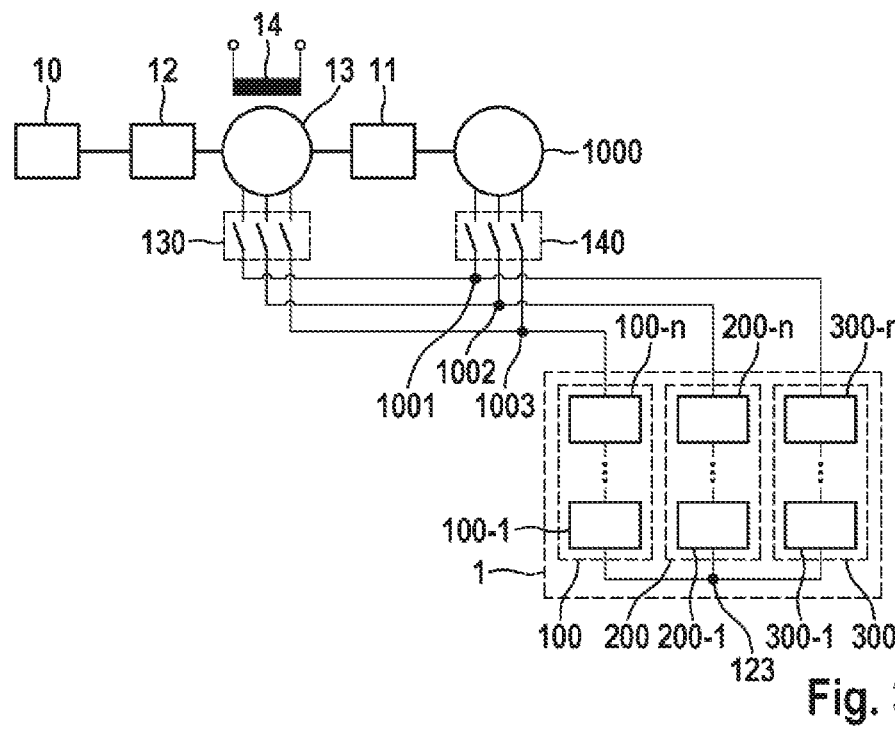
FIG. 3 shows a schematic circuit diagram of a third embodiment of the energy supply device.

FIG. 3 schematically shows a block circuit diagram of a third embodiment of the energy storage device. The third embodiment differs from the second embodiment only by way of a few details. Identical features and components are identified by identical reference numerals and will not be described separately again.

The third embodiment differs from the second embodiment by virtue of an arrangement of a mechanical clutch 11 in the mechanical connection between the generator 13 and the drive machine 1000. In the variant illustrated in FIG. 3, the clutch between the internal combustion engine 10 and the transmission 12 of the embodiment in FIG. 2 is dispensed with. Said clutch can additionally be provided in another variant, not illustrated. One advantage of the arrangement of the clutch 11 between the generator 13 and the drive machine 1000 is that charging is also possible when the vehicle is stationary. In the normal mode, the drive machine 1000 is typically permanently connected to at least one wheel of the vehicle which is to be driven. By virtue of arranging the clutch 11 between the generator 13 and the drive machine 1000, it is possible for the generator 13 to rotate with the internal combustion engine 10, while the drive machine 1000 and the vehicle are stationary. The clutch 11 is disengaged when the internal combustion engine 10 is started. For the purpose of coupling-in during driving, the internal combustion engine is moved to a suitable rotation speed and a suitable transmission ratio is set on the transmission in order to allow the coupling-in operation to take place smoothly. The clutch 11 is closed, the switching device 140 is opened and the switching device 130 is closed. In this operating state, driving can be performed by means of the closed mechanical clutch 11, while the energy storage device 1 is charged by means of the generator 13. If the vehicle is stationary or moving below a minimum speed, the clutch 11 is opened while the internal combustion engine 10 continues to rotate, with the energy storage device 1 being charged by the generator 13 when the vehicle is stationary. The clutch 11 between the generator 13 and the drive machine 1000 is particularly preferably designed such that it effects an identical phase position of the electrical phases of the generator and motor when the clutch is in the closed state. By way of example, this can be realized by an interlocking connection, for example in the form of a claw connection in the manner of a synchronized transmission. The interlocking connection is only active when the position of the poles of the generator 13 and of the drive machine 1000 is the same.

Figure 4:
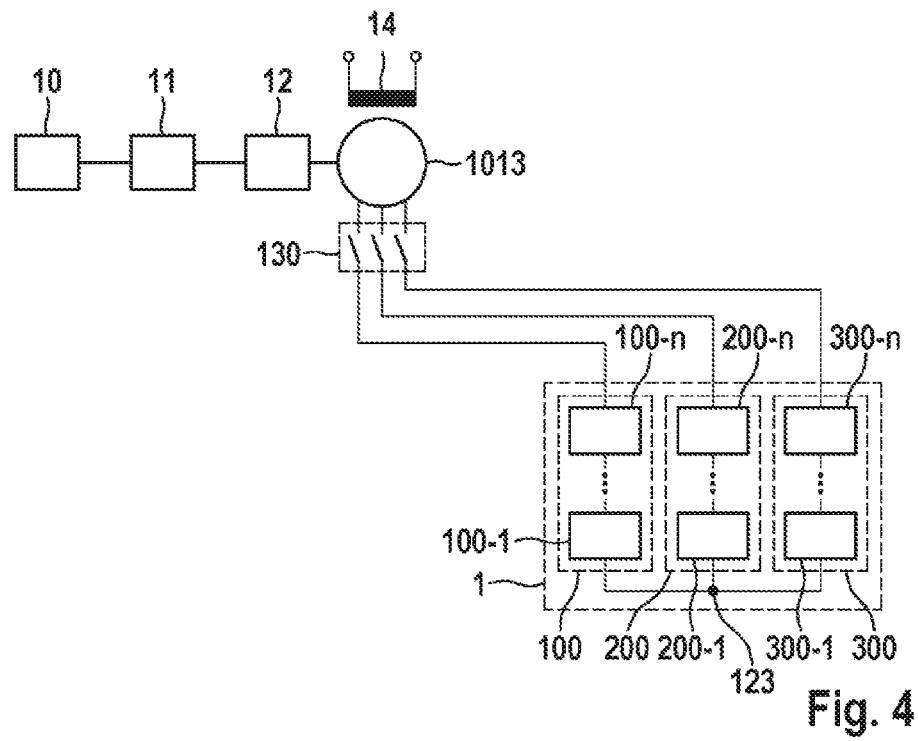
FIG. 4 shows a schematic circuit diagram of a fourth embodiment of the energy supply device.

FIG. 4 schematically shows a block circuit illustration of a fourth embodiment of the energy storage device. Only some details of the fourth embodiment differ from the first embodiment. Identical features and components are provided with the same reference symbols and will not be explained separately again.

The fourth embodiment differs from the first embodiment in that the generator 13 and the drive machine 1000 in FIG. 1 are combined to form a combined generator/drive machine 1013, wherein, in contrast to the other embodiments, the drive machine forms part of the range extender. The permanent mechanical connection between the drive machine 1000 and the energy storage device 1 in FIG. 1 is dispensed with as a separate detail since the generator/drive machine 1013 includes this connection. The generator/drive machine 1013 is connected to the energy storage device 1 by means of the switching device 130. In this case, no converter is provided between the energy storage device 1 and the generator/drive machine 1013. The generator/drive machine 1013 can be designed as a transversal flux machine in one exemplary embodiment. The clutch 11 is preferably a force-fitting clutch, which also applies to all of the other embodiments in which the clutch 11 is arranged between the internal combustion engine 10 and the transmission 12. When the clutch 11 is closed, driving can be performed purely mechanically by way of the power of the internal combustion engine 10, while the generator/drive machine 1013 operates as a generator and charges the energy storage device 1.

Figure 5:
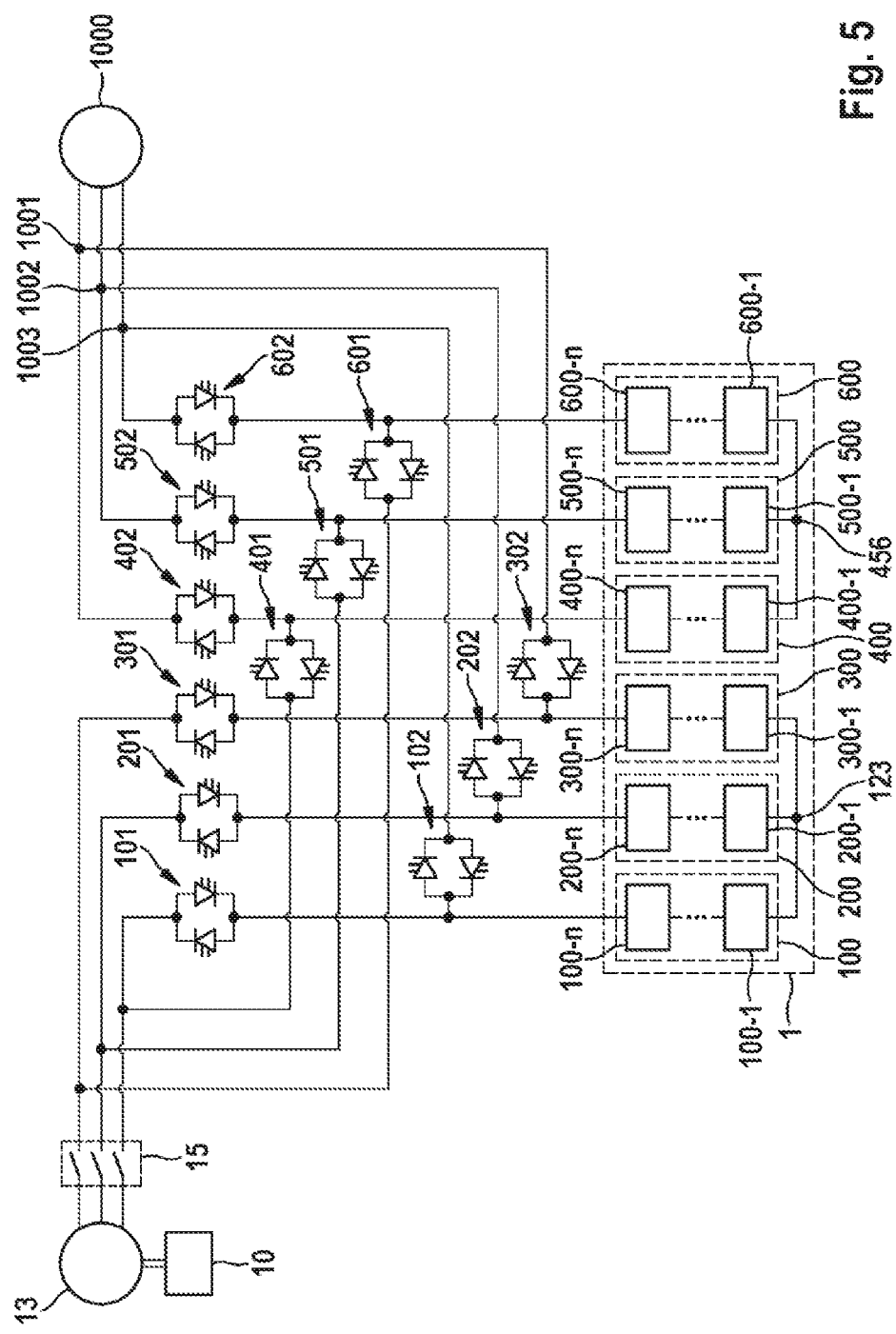
FIG. 5 shows a schematic circuit diagram of a fifth embodiment of the energy supply device.

FIG. 5 schematically shows a fifth embodiment of the energy storage device in the form of a block circuit diagram. In the fifth embodiment, a range extender comprises at least an internal combustion engine 10 and a generator 13. However, the range extender can also comprise further components, as described, for example, in one of the first to fourth embodiments. The generator 13 is of three-phase design. Said generator can be connected to the energy storage device 1 by means of a switching device 15. The switching device 15 is preferably designed as a three-pole safety protection means. As an alternative or in addition, switching devices 101, 201, 301, 401, 501 and 601 are provided between the energy storage device 1 and the generator 13. The energy storage device 1 has six energy supply branches 100, 200, 300, 400, 500 and 600. The energy supply branches 100, 200 and 300 are each interconnected at one of their ends to form a star point 123. In the same way, the energy supply branches 400, 500 and 600 are interconnected at one of their ends to form a second star point 456. The energy supply branches which are each interconnected by means of a star point can perform the function of an energy storage device, for example as described above, on their own. Therefore, the fifth embodiment comprises two energy storage device elements 100, 200, 300, 123 and 400, 500, 600, 456, which can be controlled independently of one another, in the energy storage device 1 of said fifth embodiment.

In a normal discharge mode without a range extender, the coupling units are discharged within the energy cell modules 100-1 to 600-n in accordance with a known method for operating an energy storage device 1 of this kind. This is possible separately in each case by way of that portion of the energy storage device 1 which is formed from the energy supply branches 100, 200 and 300 and by way of the portion which is formed from the energy supply branches 400, 500 and 600.

The energy supply device comprises switching devices 101, 201, 301 and, respectively, 401, 501, 601 by way of which the sets of energy supply branches 100, 200, 300 and, respectively, 400, 500, 600 can be connected to the drive machine 1000. In the driving mode, in each case one of the sets of energy supply branches 100, 200, 300 and, respectively, 400, 500, 600 can be discharged by means of closing the switching devices 101, 201, 301 and, respectively, 401, 501, 601. Discharging of the two interconnected sets of energy supply branches 100, 200, 300 and, respectively, 400, 500, 600 can be alternated in order to achieve more uniform discharging of the energy supply branches. However, one of the two sets of energy supply branches 100, 200, 300 and, respectively, 400, 500, 600 is particularly preferably initially discharged down to a critical low state of charge. A critical low state of charge can be a low state of charge of an individual energy cell module or of a plurality of energy cell modules, for example an average value of the state of charge of a plurality of energy cell modules. When a critical low state of charge is reached in one of the sets of energy supply branches 100, 200, 300 and, respectively, 400, 500, 600, the internal combustion engine 10 is started and the generator 11 supplies a three-phase sinusoidal generator voltage. One of the two sets of energy supply branches 100, 200, 300 and, respectively, 400, 500, 600 is then charged with the generator voltage by the switching elements 101, 201, 301 and, respectively, 401, 501, 601 being electrically conductively closed. The respectively other set of energy supply branches 100, 200, 300 and, respectively, 400, 500, 600 is connected to the drive machine 1000 by means of the switching devices 102, 202, 302 and, respectively, 402, 502, 602 in order to maintain the driving mode. In this way, a set of lines 100, 200, 300 and, respectively, 400, 500, 600 can be charged at the same time, while a driving operation is possible from the other set of lines 400, 500 and 600 and, respectively, 100, 200, 300. All of the other switches remain open. In this embodiment, the generator has a performance capacity which is greater than the possible power consumption by the drive machine 1000. A set of interconnected energy supply branches 100, 200, 300 and, respectively, 400, 500, 600 can be charged using methods which are known from the prior art or using one of the above-described methods. The switching devices 101, 201, 301, 401, 501, 601 and 102, 202, 302, 402, 502, 602 are preferably bidirectional semiconductor switches. All of the energy cell modules of an energy supply branch 100, 200, 300, 400, 500, 600 are charged on average over time, so that energy cell modules 100-1 to 600-n which were in the bypass mode for a certain time are alternately moved to the charging mode, and vice versa. Both of the sets of interconnected energy supply branches 100, 200, 300 and, respectively, 400, 500, 600 also charged on average over time, so that the set of energy supply branches 100, 200, 300, 400, 500, 600 which has just been charged is used for the driving operation after a certain time—for example 1, 10 or 100 seconds—by switching over the corresponding switching devices. Therefore, both of these sets are charged on average. The internal combustion engine 10 is switched off when a certain average, upper charging threshold of the energy cell modules 100-1 to 600-n is reached.

Figure 6:
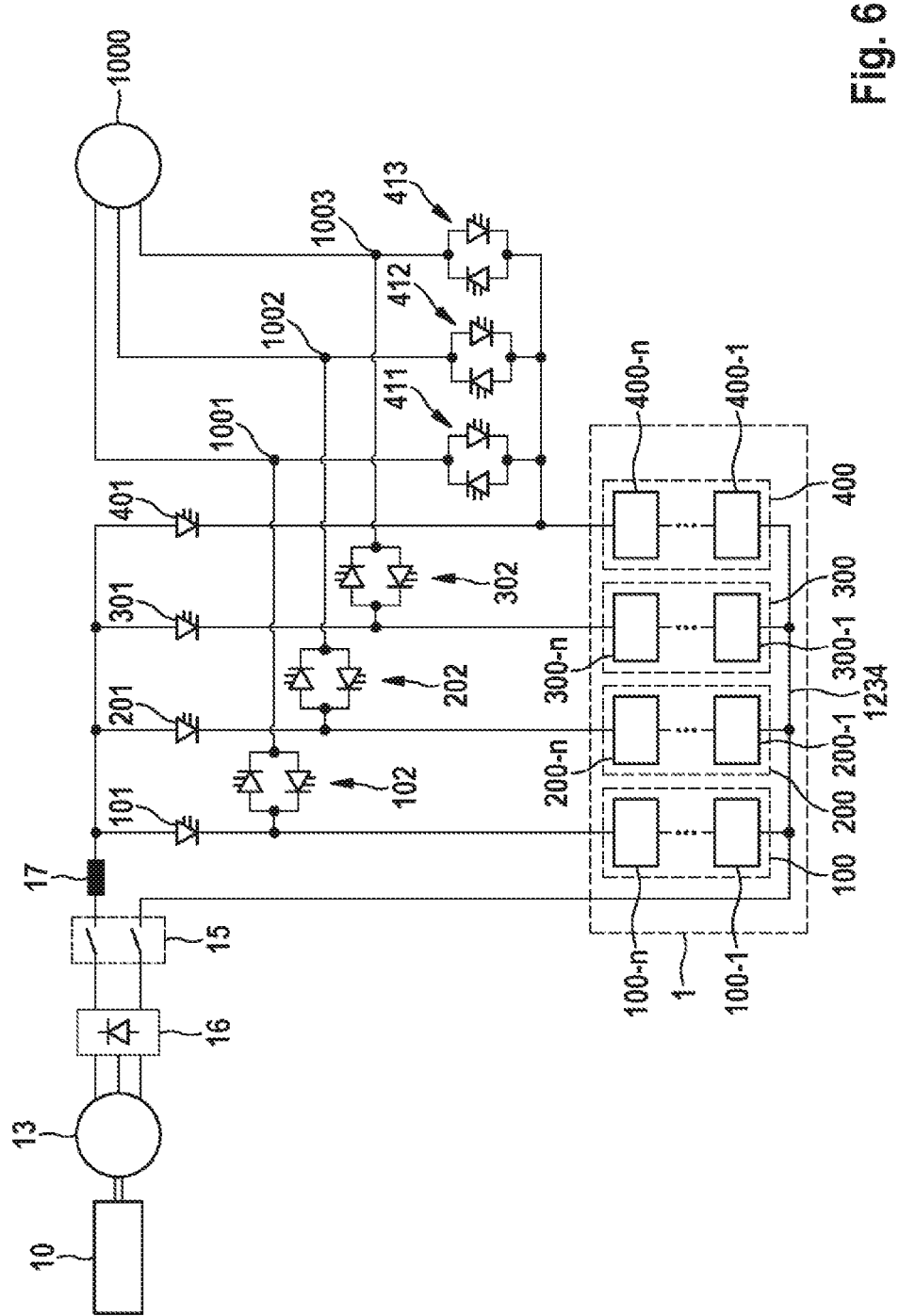
FIG. 6 shows a schematic circuit diagram of a sixth embodiment of the energy supply device.

FIG. 6 shows a sixth embodiment of the energy supply device in the form of a schematic block circuit diagram. A range extender comprises an internal combustion engine 10 and a generator 13 and also, under certain circumstances, further components, as are described, for example, with reference to one of embodiments 1 to 4 or are known according to the prior art. The generator 13 and a drive machine 1000 each have three phases. An energy storage device 1 comprises four energy supply branches 100, 200, 300, 400 which are each interconnected at one of their ends to form a star point 1234. The energy supply branches 100, 200, 300, 400 comprise energy cell modules 100-1 to 400-n. A potential of the generator 13 is connected to the star point 1234 by means of a rectifier device 16 and a switching device 15, and a further potential of the generator 13 is connected to the ends of the energy supply lines 100, 200, 300, 400, which are each not connected to the star point 1234, by means of switching devices 101, 201, 301 and 401. An inductor 17 which smooths the direct current from the rectifier device 16 is optionally connected between the rectifier device 16 and the energy storage device 1.

The energy supply branches 100, 200, 300 can be connected to in each case one of the phases of the drive machine 1000 by means of switching devices 102, 202 and, respectively, 302. The energy supply branch 400 can be connected to each of the three phases of the drive machine 1000 by means of three switching devices 411, 412 and 413. In the driving mode without operation of the range extender, the coupling units of the energy cell modules 100-1 to 400-n are controlled such that three of the energy supply branches 100, 200, 300, 400 generate a stepped, sinusoidal, three-phase output voltage for the drive machine 1000. The switching devices 101, 201, 301 and 401 are connected such that no current flows across them. The choice as to which three energy supply branches of the four energy supply branches 100, 200, 300, 400 are instantaneously used for the driving operation relate both to actuation of the coupling units of the energy supply branches 100, 200, 300, 400 which are used for the driving operation and also the suitable switching of the semiconductor switches 102, 202, 302, 411, 412, 413. If, for example, the lines 100, 200, 300 are intended to be used for the driving operation, the switching devices 102, 202 and 302 are closed and 411, 412 and 413 are opened. If, for example, the lines 200, 300 and 400 are intended to be used for the driving operation, the switching device 102 is opened, the switching devices 202, 302 and 411 are closed and the switching devices 412 and 413 are opened. Accordingly, the power supply branch 400 instead of one of the power supply branches 100, 200 or 300 can be used for the driving operation by the switching device 102, 202 or 302 of the energy supply branch 100, 200 or 300 which is not to be used being opened and the energy supply branch 400 being connected by means of one of the switching devices 411, 412 or 413 to the phase of the drive motor 1000 to which the energy supply branch 100, 200, 300, which is not used, could be connected by way of its associated switching device 102, 202 or 302. In order to uniformly discharge all of the energy supply branches 100, 200, 300 and 400, the energy supply branch 100, 200, 300 and 400 which is not used for discharging purposes is exchanged, so that all of the lines 100, 200, 300 and 400 are used on average over time.

If a critically low state of charge of the energy cell modules 100-1 to 400-n or of an individual energy cell module 100-1 to 400-n is reached, the internal combustion engine 10 is started and the generator 13 supplies a DC voltage by means of the rectifier device 16, the closed switching device 15 and the optional inductor 17. Said DC voltage is used in order to charge an energy supply branch 100, 200, 300 or 400 which was not just used for discharging purposes. To this end, the switching device 101, 201, 301 or 401 which is connected to said energy supply branch 100, 200, 300 or 400 is closed. Therefore, a current can flow from the generator 13 through said energy supply branch 100, 200, 300 or 400 and charge it. The coupling devices in the energy supply branch 100, 200, 300 or 400 are accordingly actuated for charging purposes. If, for example, the energy supply branches 100, 200 and 300 drive the drive machine, the switching device 401 is closed, so that the energy supply branch 400 can be charged. The rectified generator voltage is designed such that the charging current can be controlled by means of the energy cell modules 100-1 to 400-n which are to be charged. This is done by several or fewer energy cell modules 100-1 to 400-n in an energy supply branch 100, 200, 300 or 400 being coupled into said energy supply branch for charging purposes. The rest of the energy cell modules 100-1 to 400-n are switched to the bypass mode by way of the respective coupling unit. All of the energy cell modules 100-1 to 400-n of an energy supply branch 100, 200, 300, 400 are charged on average over time, so that energy cell modules 100-1 to 400-n, which were in the bypass mode for a certain time, are alternately moved to the charging mode, and vice versa. All of the energy supply branches 100, 200, 300, 400 should also be charged on average over time, so that the energy supply branch which was charged just now is used for the driving operation and another energy supply branch is charged after a certain time, for example 1, 10 or 100 seconds, by switching over the respective switching devices. The internal combustion engine 10 is switched off when a certain average upper charging threshold of the energy cell modules 100- to 400-n is reached.

Figure 7:
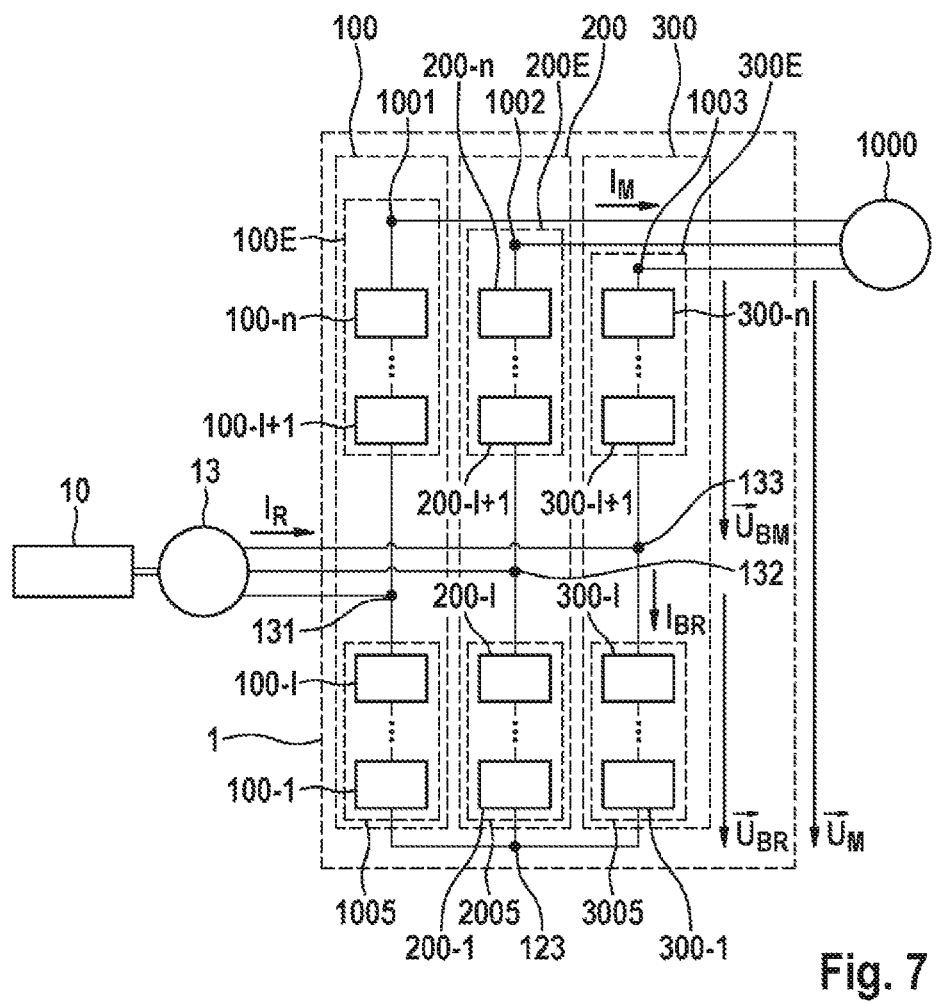
FIG. 7 shows a schematic circuit diagram of a seventh embodiment of the energy supply device.

FIG. 7 schematically shows a seventh embodiment in the form of a block circuit diagram. A range extender comprises an internal combustion engine 10 and a generator 13 and also, under certain circumstances, further components, for example as are described in the first to fourth embodiments. The generator 13 is a three-phase generator. The energy storage device 1 comprises three energy supply branches 100, 200, 300 with energy cell modules 100-1 . . . 300-n which are connected in series. A generator connection 131, 132 and, respectively, 133 is arranged in each case in the interior of each of the energy supply branches 100, 200, 300 between the energy cell modules 100-1 and 100-l+1 and, respectively, 200-1 and 200-l+1 and, respectively, 300-1 and 300-l+1. In each case one end of each of the energy supply branches is interconnected to one end of each other energy supply branch to form a star point 123. The energy cell modules 100-1 to 100-l and, respectively, 200-1 to 200-l and, respectively, 300-1 to 300-l each form an energy supply branch element 100S and, respectively, 200S and, respectively, 300S which is in each case arranged between one of the generator connections 131, 132 and, respectively, 133 and the star point 123. The energy cell modules 100-l+1 to 100-n, the energy cell modules 200-l+1 to 200-n and, respectively, the energy cell modules 300-l+1 to 300-n each form an energy supply branch element 100E, 200E and, respectively, 300E which are each arranged between one of the generator connections 131, 132 and, respectively, 133 and an energy supply connection 1001, 1002 and, respectively, 1003. In each case two energy supply line elements, specifically the energy supply line elements 100E and 100S, 200E and 200S and also 300E and 300S, form an energy supply line 100, 200, 300. A three-phase electrical drive machine 1000 is connected to the energy supply connections 1001, 1002 and 1003.

In a normal driving mode without operation of the range extender, the energy supply lines each output a stepped, sinusoidal, three-phase output voltage to the energy supply connections 1001, 1002 and 1003. This is done until the energy cell modules fall below a lower critical charge value, after which the internal combustion engine 10 is started. The generator 11 supplies a sinusoidal three-phase AC voltage to the energy storage device 1. As a result, the energy cell modules 100-1 to 100-l, 200-1 to 200-l and 300-1 to 300-l are recharged, with the driving mode being maintained by the drive machine 1000 at the same time.

A method for driving by way of an energy supply from the energy storage device 1 includes controlling the energy cell modules 100-1 to 300-n in the available operating modes of the coupling units in order to allow the driving operation at different speeds at the same time as operating the range extender. The range extender preferably operates at a constant rotation frequency. It preferably produces its maximum power. Its power can be divided between driving operation and charging operation.

Both the generator 13 and the drive machine 1000 can be controlled with the aid of the energy storage device 1 in line with methods, which are known from the prior art, for controlling three-phase machines. This can be described with reference to voltage vectors in a space vector representation. In the space vector representation, the axes u, v and w represent the three phases of the energy storage device 1. The generator voltage can be represented by the space vector $\vec{U}_{BR}$. This voltage vector can be set by way of the energy cell modules 100-1 to 100-l, 200-1 to 200-l and 300-1 to 300-l, so that the three-phase AC voltage $\vec{U}_M$ which is applied to the generator connections 131, 132 and 133 matches the generator voltage, in order to effect charging of energy cell modules in the energy supply branch elements 100S, 200S and 300S. The potentials for supplying power to the drive machine 1000 are applied to the energy supply connections 1001, 1002 and 1003. The three-phase AC voltage $\vec{U}_M$ is made up of the voltages across the energy supply branch elements 100E, 200E and 300E and also 100S, 200S and 300S, wherein the energy supply branch elements 100E, 200E and 300E each contribute a phase to the space vector $\vec{U}_{BM}$ and the energy supply branch elements 100S, 200S and 300S each contribute a component of the space vector $\vec{U}_{BR}$. Accordingly, the space vector of the entire energy storage unit 1 can be represented as $\vec{U}_m = \vec{U}_{BM} + \vec{U}_{BR}$. The space vectors $\vec{U}_M$ and $\vec{U}_{BR}$ generally have different frequencies. The space vector $\vec{U}_M$ rotates at the frequency of the drive machine 1000, while the space vector $\vec{U}_{BR}$ rotates at the frequency of the generator 13. Therefore, the phase angle between these two space vectors can assume any desired value. In order to match the different three-phase AC voltages to one another, the energy cell modules 100-l+1 to 300-n of the energy supply branch elements 100E, 200E and 300E can supply the difference voltage $\vec{U}_{BR}$ between the space voltage vectors $\vec{U}_M$ and $\vec{U}_{BR}$. The magnitude of $\vec{U}_{BM}$ is, at most, equal to the sum of the maximum magnitudes of the voltage vectors $\vec{U}_M$ and $\vec{U}_{BR}$. These maximum magnitudes are prespecified by the design of the drive machine 1000 and, respectively, the design of the generator 13. The number n of energy cell modules in an energy supply branch 100, 200, 300 is designed such that the maximum possible magnitude of the voltage vector $\vec{U}_{BM}$ can always be set. The number l of energy cell modules 100-1 to 100-l and, respectively, 200-1 to 200-l and, respectively, 300-1 to 300-l of the energy supply line elements 100S, 200S and, respectively, 300S is designed such that the magnitude of the voltage vector $\vec{U}_{BR}$ can always be set to be greater than the maximum terminal voltage of the generator 13.

The internal combustion engine 10 is dimensioned such that the output power of said internal combustion engine is greater than the power which is received by the drive machine 1000 on average over time. The energy which is not required for the drive machine 1000 can be used for charging the battery modules 100-1 to 300-n. Two different procedures in two different variants are possible for said charging operation.

The energy cell modules 100-1 to 300-l in the energy supply line elements 100S, 200S and 300S can be charged with current $I_{BR}$ from the generator 13. The charging current is controlled by means of setting the voltage vector $\vec{U}_{BR}$. Methods for uniformly discharging energy cell modules 100-1 to 300-n in an energy storage device 1 are known from the prior art. Said methods can analogously also be used for the charging process. After a charging process, all of the energy cell modules 100-1 to 100-l, 200-1 to 200-l and 300-1 to 300-l are preferably uniformly charged in the energy supply line elements 100S, 200S and 300S. After the energy supply line elements 100S, 200S and 300S are charged, the internal combustion engine is switched off and energy for the driving operation is drawn from the energy cell modules 100-1 to 100-l, 200-1 to 200-l and 300-1 to 300-l in the energy supply line elements 1005, 200S and 300S. Another portion $I_M$ of the current $I_R$ from the generator 13 flows through the energy supply line elements 100E, 200E and 300E to the drive machine 1000. Therefore, the drive machine 1000 is supplied with power from the generator, with the energy supply branch elements 100S, 200S and 300S being charged at the same time.

In order to achieve uniform distribution of the energy in the energy cell modules 100-l+1 to 100-n, 200-l+1 to 200-n and 300-l+1 to 300-n in the energy supply line elements 100E, 200E and 300E, a partial quantity of energy cell modules 100-l+1 to 100-n, 200-l+1 to 200-n and 300-l+1 to 300-n can be coupled into their energy supply line elements 100E, 200E and 300E such that the electrochemical cells of said energy cell modules can be charged while the drive machine 1000 is operating as a motor. These energy cell modules 100E, 200E and 300E then generate a voltage, which is opposite the voltage which is required for operating the drive machine 1000, in the energy supply line elements 100E, 200E and 300E. A sufficient number of energy cell modules 100-l+1 to 100-n, 200-l+1 to 200-n and 300-l+1 to 300-n are available in order to nevertheless provide the output voltage, which is required for the drive machine 1000, at the energy supply connections 1001, 1002 and 1003. This method can be applied irrespective of whether the internal combustion engine 10 is in operation or not. The partial quantity of energy cell modules 100-l+1 to 100-n, 200-l+1 to 200-n and 300-l+1 to 300-n which are charged is preferably varied such that all of the energy cell modules 100-l+1 to 100-n, 200-l+1 to 200-n and 300-l+1 to 300-n are charged for the same period of time on average over time. Uniform distribution of the energy to all of the energy cell modules 100-l+1 to 100-n, 200-l+1 to 200-n and 300-l+1 to 300-n in the energy supply line elements 100E, 200E and 300E can be achieved in this way.

Figure 8:
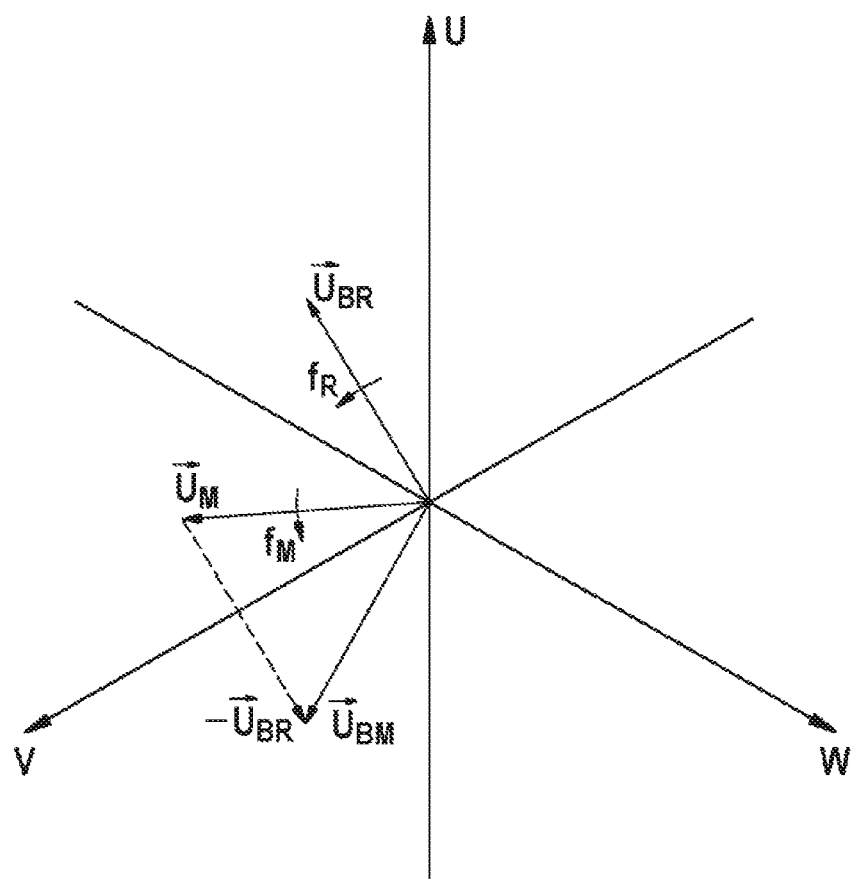
FIG. 8 shows a space vector diagram for graphically determining a space vector which is set by way of a portion of a BDI.

FIG. 8 shows a space vector representation of a three-phase AC voltage across the energy storage device 1 of the seventh embodiment and also three-phase AC voltages $\vec{U}_{BM}$ and $\vec{U}_{BR}$ of the energy supply branch elements 100E, 200E and 300E and, respectively, of the energy supply branch elements 100S, 200S and 300S. Said figure shows a three-dimensional coordinate system with the axes u, v and w, where in each case one of the axes u, v and w represents the voltage of a phase. Therefore, each three-phase AC voltage can be represented as a space vector in the coordinate system. The space vector rotates at the frequency of the respective AC voltage in the coordinate system. FIG. 8 shows a graphical determination of the space vector $\vec{U}_{BM}$ which can be set in the energy supply branch elements 100E, 200E and 300E in order to compensate for the frequency difference between the generator 13 and the drive machine 1000. The calculation can be mathematically represented as $\vec{U}_{BM} = \vec{U}_M - \vec{U}_{BR}$. In the graphical determination, the space vector $\vec{U}_{BR}$ is subtracted from the space vector $\vec{U}_M$ by being added to the tip of the space vector $\vec{U}_M$ with a reversed arrow direction. The tip of the space vector $\vec{U}_{BM}$ which is to be calculated and of which the origin is at the origin of the coordinate system lies at the tip of the space vector $\vec{U}_{BR}$ which was inversely added. FIG. 8 represents an instantaneous determination of the space vector $\vec{U}_{BM}$. Continuous determination of the space vector $\vec{U}_{BM}$ is necessary in order to operate the energy supply device, it being possible for this continuous determination to be performed, for example, by real-time calculation or checking predefined data.

The invention claimed is:

1. An energy supply device for an electrically operated vehicle having an electric drive motor, comprising:
    an electrical energy storage device; and
    a range extender having an internal combustion engine and a generator configured to generate alternating current, the generator can be mechanically coupled or is mechanically coupled to the internal combustion engine,
    wherein the energy storage device is configured to be charged during a driving mode with alternating current from the generator,
    wherein the energy storage device has a plurality of energy supply connections, at each of which one of several controllable potentials can be provided, and a plurality of energy supply branches each with a plurality of energy cell modules which are connected in series,
    wherein the plurality of energy supply branches are interconnected at one end to form a star point and each energy supply connection can be connected or is connected to one end of an energy supply branch, and
    wherein each energy cell module of the plurality of energy cell modules has an electrochemical cell and a controllable coupling device configured to electrically couple the electrochemical cell into its energy supply branch.

2. The energy supply device as claimed in claim 1, wherein the energy supply device and/or the energy storage device are/is configured to charge some of the energy cell modules with the generator.

3. The energy supply device as claimed in claim 2, wherein:
    the energy supply device includes more of the energy supply branches than the energy supply connections,
    each energy supply branch is configured to be electrically connected to an energy supply connection and to the generator, and
    in each case one energy supply branch is connected to each of the energy supply connections during an energy supply mode, and an energy supply branch, which is not connected to an energy supply connection, is connected to the generator during a charging mode which takes place at the same time.

4. The energy supply device as claimed in claim 1, wherein:
    two star points are formed by interconnecting in each case a plurality of the energy supply branches,
    a number of the plurality of energy supply branches is equal to a number of energy supply connections, and
    the energy supply branches are connectable which belong to one star point in each case jointly to the generator or/and to the energy supply connections.

5. The energy supply device as claimed in claim 1, wherein the energy storage device has a generator connection, to which the generator is connected, in each case between two of the energy cell modules in an interior of a plurality of the energy supply branches.

6. The energy supply device as claimed in claim 1, wherein:
    the internal combustion engine is connected to the generator with a transmission,
    the generator and the drive machine have an equal number of pole pairs, and
    the generator can be coupled or is coupled to the drive machine in a phase-locked manner.

7. A method for charging an energy supply device for an electrically operated vehicle having an electric drive motor, the energy supply device including an electrical energy storage device and a range extender having an internal combustion engine and a generator, the method comprising:
    charging the energy storage device with the generator, which generates alternating current, during energy output from the energy supply device,
    wherein the generator is mechanically connectable to the internal combustion engine,
    wherein the energy storage device has a plurality of energy supply connections, at each of which one of several controllable potentials can be provided, and a plurality of energy supply branches each with a plurality of energy cell modules which are connected in series,
    wherein the plurality of energy supply branches are interconnected at one end to form a star point and each energy supply connection is connectable to one end of an energy supply branch, and
    wherein each energy cell module of the plurality of energy cell modules has an electrochemical cell and a controllable coupling device configured to electrically couple the electrochemical cell into its energy supply branch.

8. The method as claimed in claim 7, further comprising:
    charging some of the electrochemical cells in the energy cell modules of the energy storage device with the generator.

9. The method as claimed in claim 8, further comprising:
    connecting each of the energy supply connections to an energy supply branch for current withdrawal purposes during an energy supply model; and
    connecting a further energy supply branch to the generator for charging purposes during a charging mode which takes place at the same time.

10. The method as claimed in claim 7, further comprising:
    charging energy cell modules in the portion of one or more energy supply branches between the generator connection and the star point with the generator, while outputting electrical energy to the energy supply connections of the energy supply branches.

11. The method as claimed in claim 7, further comprising:
    charging energy cell modules in the portion of one or more energy supply branches between the generator connection and the respective energy supply connection with the generator, while outputting electrical energy to the energy supply connections of the energy supply branches.

12. The method as claimed in claim 10, wherein the energy storage device is configured as an inverter by a process of coupling energy cell modules into their energy supply branches being controlled in such a way that the energy cell modules generate a potential difference between alternating potentials of the generator with a generator frequency at the generator connections and alternating potentials for the drive machine with a drive machine frequency, which is different from the generator frequency, at the energy supply connections.

13. The method as claimed in claim 7, further comprising:
    suspending charging and non-charging operation in such a way that all of the electrochemical cells which are to be coupled-in for charging purposes or energy supply branches which are to be charged are charged on average over time, for the purpose of charging electrochemical cells in an energy supply branch or energy supply branches in a time interval.

* * * * *